(12) United States Patent
Dave et al.

(10) Patent No.: US 9,883,027 B2
(45) Date of Patent: Jan. 30, 2018

(54) SYSTEM AND METHOD OF ESTABLISHING COMMUNICATION BETWEEN ELECTRONIC DEVICES

(71) Applicant: Apple Inc., Cupertino, CA (US)

(72) Inventors: Swapnil R. Dave, Santa Clara, CA (US); Kaustubh M. Rao, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 53 days.

(21) Appl. No.: 15/050,171

(22) Filed: Feb. 22, 2016

(65) Prior Publication Data

US 2016/0241710 A1 Aug. 18, 2016

Related U.S. Application Data

(63) Continuation of application No. 13/772,158, filed on Feb. 20, 2013, now Pat. No. 9,270,708.

(51) Int. Cl.
*H04L 29/06* (2006.01)
*H04M 3/42* (2006.01)
(Continued)

(52) U.S. Cl.
CPC ............ *H04M 3/42* (2013.01); *H04L 43/10* (2013.01); *H04L 43/16* (2013.01);
(Continued)

(58) Field of Classification Search
CPC ............ H04W 24/00; H04W 52/0261; H04W 52/0277; H04W 52/0225; H04W 8/24;
(Continued)

(56) References Cited

U.S. PATENT DOCUMENTS 5,805,995 A * 9/1998 Jiang .................... H04W 36/30
455/436
7,826,819 B2 * 11/2010 Ohno ................ H04W 52/0229
455/3.01

(Continued)

FOREIGN PATENT DOCUMENTS

WO 03/010941 A2 2/2003

OTHER PUBLICATIONS

Non-Final Office Action for U.S. Appl. No. 13/772,158, dated Feb. 9, 2015, 14 pages.

(Continued)

*Primary Examiner* — Alina N Boutah
(74) *Attorney, Agent, or Firm* — Kilpatrick Townsend & Stockton LLP

(57) ABSTRACT

A contactability of a user can be maintained by identifying a secondary device and causing a contact device to establish a communication session with the secondary device when a primary device becomes unavailable. In some embodiments, when a power level of a primary device falls below a threshold, the primary device can identify a secondary device previously associated with the primary device. The secondary device can receive a signal periodically from the primary device. In response to ceasing to receive the signal that is being sent periodically from the primary device, the secondary device in some embodiments can send a notification to a contact device to inform the contact device to send a communication request to the secondary device. The secondary device can receive the communication request from the contact device and establish a communication session with the contact device.

20 Claims, 8 Drawing Sheets

(51) Int. Cl.
    *H04W 52/02*    (2009.01)
    *H04L 12/26*    (2006.01)
    *H04W 24/04*    (2009.01)
    *H04W 4/12*     (2009.01)

(52) U.S. Cl.
    CPC ......... *H04L 65/1069* (2013.01); *H04W 24/04* (2013.01); *H04W 52/0261* (2013.01); *Y02B 60/50* (2013.01)

(58) Field of Classification Search
    CPC .......... H04W 4/16; H04W 4/12; Y02B 60/50; H04L 65/1069
    USPC ...... 709/224.227; 370/311; 455/574, 412, 2, 455/572, 573; 713/320
    See application file for complete search history.

(56) References Cited

U.S. PATENT DOCUMENTS

| | | | |
|---|---|---|---|
| 7,925,784 B2 | 4/2011 | Pince et al. | |
| 8,320,976 B2* | 11/2012 | Nagasawa | H04W 52/0277 455/127.4 |
| 8,350,694 B1* | 1/2013 | Trundle | G08B 25/08 340/539.11 |
| 8,611,934 B2* | 12/2013 | Kuulusa | H01M 10/48 455/414.1 |
| 8,619,653 B2* | 12/2013 | Ji | H04W 52/0216 370/311 |
| 8,984,120 B2* | 3/2015 | Saxena | H04L 51/30 709/224 |
| 9,065,922 B2* | 6/2015 | Khan | H04L 67/306 |
| 2006/0087993 A1* | 4/2006 | Sengupta | H04W 68/00 370/310 |
| 2006/0111136 A1* | 5/2006 | Song | H04W 4/16 455/519 |
| 2006/0121951 A1* | 6/2006 | Perdomo | H04M 1/72513 455/572 |
| 2008/0192666 A1* | 8/2008 | Koskan | H04W 52/0261 370/311 |
| 2008/0311961 A1* | 12/2008 | Cotevino | H04W 4/16 455/574 |
| 2009/0221303 A1* | 9/2009 | Soliman | H04W 52/0274 455/458 |
| 2010/0093378 A1* | 4/2010 | Chin | H04W 68/00 455/458 |
| 2010/0146076 A1* | 6/2010 | Adriazola | H04L 65/4084 709/219 |
| 2010/0264817 A1 | 10/2010 | Bouten et al. | |
| 2011/0122864 A1* | 5/2011 | Cherifi | H04M 3/58 370/352 |
| 2011/0134832 A1* | 6/2011 | Soliman | H04W 88/06 370/328 |
| 2012/0066332 A1* | 3/2012 | Deprun | H04W 4/02 709/206 |
| 2012/0117401 A1* | 5/2012 | Gobriel | G06F 1/3209 713/320 |
| 2014/0086130 A1* | 3/2014 | Nakamori | H04W 36/0088 370/311 |
| 2014/0171064 A1* | 6/2014 | Das | H04W 84/18 455/426.1 |
| 2014/0228062 A1* | 8/2014 | Rubowitz | H04W 52/0277 455/466 |
| 2014/0237123 A1 | 8/2014 | Dave et al. | |

OTHER PUBLICATIONS

Notice of Allowance dated Dec. 23, 2015 for U.S. Appl. No. 13/772,158, 14 pages.
PCT/US2014/014941 "International Search Report & Written Opinion", International Search Report & Written Opinion, dated May 20, 2014, 10 pages.

* cited by examiner

SYSTEM AND METHOD OF ESTABLISHING COMMUNICATION BETWEEN ELECTRONIC DEVICES

CROSS REFERENCE TO RELATED APPLICATIONS

The present application claims the benefit of U.S. Provisional application Ser. No. 13/772,158, filed Feb. 20, 2013, which is hereby incorporated by reference for all purposes.

BACKGROUND

The present disclosure relates generally to electronic communication between electronic devices. In particular, the present disclosure relates to establishing communication between electronic devices based on a power level of one of the electronic devices.

Modern electronic devices have a wide range of capabilities and thereby require a large amount of processing power. Oftentimes, before a user is able to recharge an electronic device, the power level of the electronic device falls below a certain threshold and causes the electronic device to either shut down or be placed on standby. If the user is in the middle of a phone call with another user, the user would be forced to discontinue the communication with the other user. In some instances, the use may not have been able to warn the other user of the potential shutdown. The other user may thus be completely unaware of the reason that the communication has been discontinued, which may be a source of inconvenience and potential misunderstanding.

In some instances, the electronic device may power down or be placed on standby while the user is not currently using the electronic device (e.g., in the middle of a call). In those instances, the user may be blindsided for any calls that may come in. A concerned parent or friend also may not be able to reach the user due to the shutdown of the device. As such, there is a need to maintain a reachability of a user.

DETAILED DESCRIPTION

Figure 1:
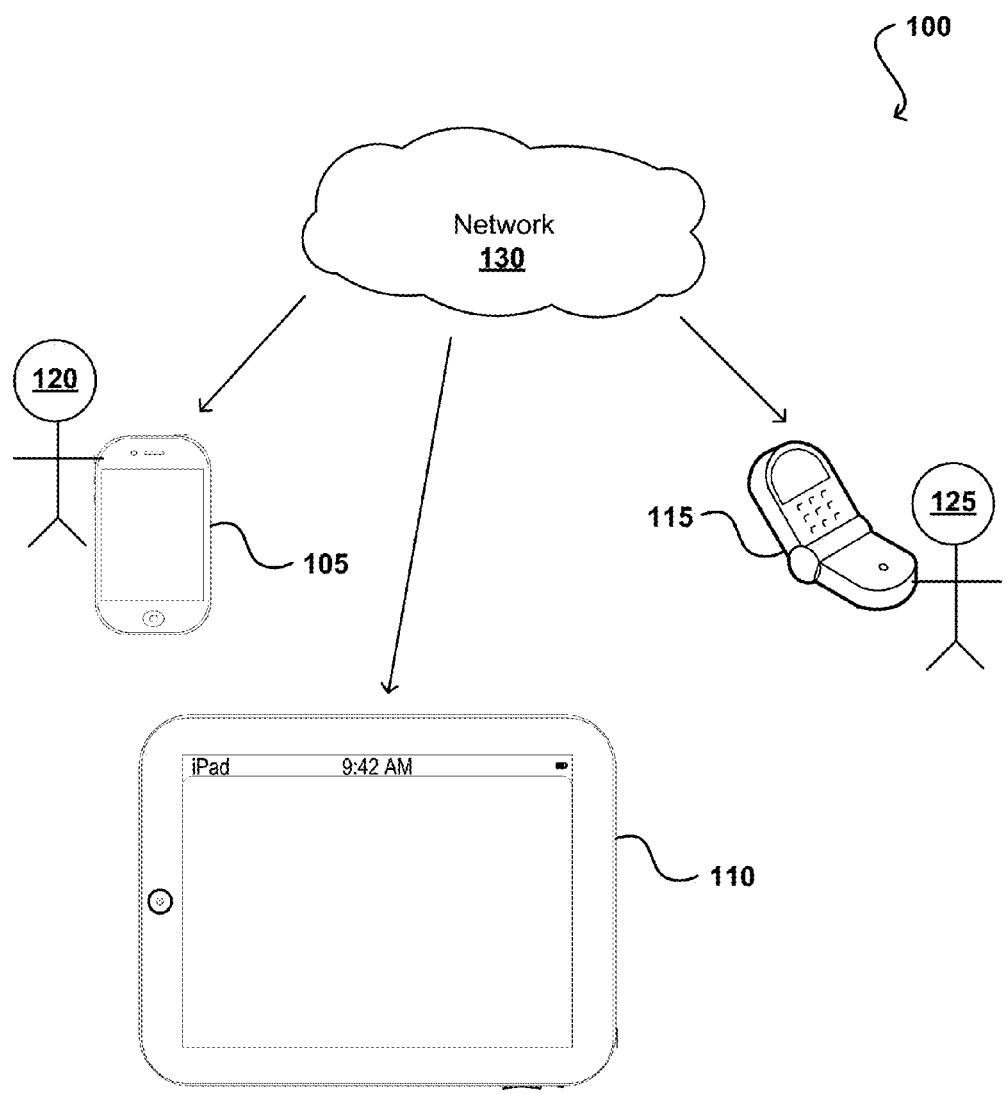
FIG. 1 illustrates an example system of some embodiments for maintaining a contactability of a user.

Aspects of the disclosure relate to systems and methods for maintaining a contactability of a user in an electronic environment. In modern day, a user typically has more than one electronic device with communication capabilities such that other users may reach the user via at least one of the user's electronic devices. In some embodiments, in response to detecting one or more triggers (e.g., a power level of an electronic device falling below a threshold value), the electronic device (the user's primary device, in this instance) may identify another electronic device as a secondary device to replace the user's primary device when the primary device becomes unavailable. The device of a participant (e.g., who is in the middle of a communication with the user, a caller trying to reach the user) may be prompted to send a communication request to the identified electronic device (i.e., the secondary device). As such, a communication session can be established between the user's secondary device and the device of the participant (also referred to as the participant device). In the event that the user's primary device becomes unavailable during a communication, the user and the participant may resume their communication in the newly established communication session with minimal interruption.

In certain embodiments, when the user's primary device detects a trigger (also referred to as a device switch stimulus), the primary device can send data to the secondary device to establish a protocol for determining the unavailability of the primary device. In addition to specifying how to determine the unavailability of the primary device, the protocol may request the secondary device to notify the participant device when the primary device has been determined to be unavailable. In some embodiments, the user's secondary device (or in some instances, a server or a basestation controller) can ping the user's primary device periodically to determine when the user's primary device becomes unavailable. Upon determining that the primary device has become unavailable, the user's secondary device (or a server or a basestation controller in some instances) can notify the participant device of the primary device's unavailability and inform the participant device to send a communication request to the secondary device. In response to receiving the communication request, the secondary device can accept the request and a communication session with the calling device can be established.

Certain embodiments relate to maintaining a contactability of a user via another one of the user's electronic devices when the user's primary electronic device becomes unavailable. As described, under various circumstances, the user may become unreachable via one of the user's multiple electronic devices. As the user may have more than one electronic device with communication capabilities, some embodiments may facilitate a contactability of the user by providing a caller an alternative way to contact the user. Certain embodiments may identify another electronic device through which the user can be reached and inform the caller of the alternative means (e.g., the type of communication network) through which the user may be contacted.

In certain embodiments, an electronic device can detect one or more triggers (also referred to as device switch stimulus) such as a power level of the electronic device falling below a threshold value. In response to detecting the one or more triggers, the electronic device (also referred to as the primary device) can identify a secondary device. The primary device can cause the secondary device to ping the primary electronic device periodically to determine when the primary device becomes unavailable (e.g., no battery life remaining, 1% battery life remaining). When the primary electronic device ceases to respond to the pinging, the secondary device can inform a participant device (that was in a communication session with the primary device or is currently trying to reach the primary device) that the primary device has become unavailable. The participant device can then send a communication request to the identified secondary device to establish a communication session.

In some embodiments, a server or a basestation controller can determine the unavailability of the primary device and cause the participant device to contact the secondary device instead. When a device switch stimulus has been received, a primary or secondary device in some embodiments can notify a base station controller (or a server) that the primary electronic device has become (or may become) unavailable. In some embodiments, the base station controller (or server) may inform the participant device of the secondary device's contact information and communication capabilities. This permits the participant device to identify the method to contact the secondary device amongst the available communication methods. The participant device may send then a communication request to the secondary device of the user based on the determined method.

In the instance where the primary and participant devices were in a communication session immediately prior to the primary device becoming unavailable, the base station controller (or server) can cause the participant device to send a communication request upon determining that the primary device is no longer available. This ensures a seamless transition for the communication. In the instance where the devices were not already in a communication session, the base station controller (or server) can cause the participant device to send a separate communication request to the secondary device upon receiving a communication request directed to the primary device.

In some embodiments, the communication capabilities of the user's secondary device may not be the same as the user's primary device. For example, the user's secondary device may not have the capability to communicate over the cellular network, but is able to communicate with other communication devices over the Internet using various communication services (e.g., voice over Internet protocol (VoIP) applications, text messaging applications). A user of the calling device may be informed of the communication capabilities of the secondary device and determine whether to send a communication request using the one of the electronic communication methods available to both users.

Various embodiments will now be discussed in greater detail with reference to the accompanying figures, beginning with FIG. 1.

I. System Overview

FIG. 1 illustrates an example system 100 of some embodiments for maintaining a contactability of a user. System 100 can include a primary electronic device 105 and a secondary electronic device 110 of a participant user 120, a participant electronic device 115 of another participant user 125, and a communication network 130. In some embodiments, one or more of the components of system 100 can be combined or omitted. For example, participant users 120 can have multiple electronic devices not shown in FIG. 1 from which the secondary device can be identified. Network 130 can be any single network or a combination of networks and can include various components, such as a server or a basestation controller, that are not shown in FIG. 1.

Electronic devices 105-115 can include any suitable type of electronic device operative to communicate with one or more electronic devices. For example, electronic devices 105-115 can include any of a variety of communication-enabled devices, including, but not limited to, a mobile telephone, a portable media player, a personal digital assistant (PDA), a networked personal computer (PC), a smartphone, a tablet computer, or other device. Some or all of electronic device 105-115 can include a wireless terminal. For purposes of the example of FIG. 1, the electronic device 105 is illustrated as a data-enabled cellular phone and the secondary device 110 is illustrated as a tablet computer with various communication services such as a video conferencing and voice over Internet protocol (VoIP).

In some embodiments, communications network 130 can include one or more network portions for communicating data and other signaling, including one or more private network portions, one or more public network portions, or a combination thereof. Communications network 130 can include a wired network (e.g., the Internet, a private Internet-Protocol (IP)-based network, etc.) and a wireless network (e.g., a cellular network, a wireless local area network (WLAN), and the like).

Electronic devices 105-115 can communicate with other devices within communications network 130 using any suitable communications protocol, such as WiFi (e.g., a 802.11 protocol), Bluetooth®, cellular networks (e.g., GSM, CDMA, EDGE, LTE, or any other suitable cellular network or protocol), TCP/IP (e.g., any of the protocols used in each of the TCP/IP layers), HTTP, FTP, VoIP, any other communications protocol, or any combination thereof. When electronic devices 105-115 include a wireless device, the electronic devices can connect to the IP network and other wireless communication networks through WiFi, Bluetooth, and other local area networks, including any suitable wired or wireless communications link or path (or a combination of these).

In the example illustrated in FIG. 1, communications network 130 can include a provider network (not shown) that has a base station controller configured to facilitate call redirection within the provider network. The base station controller, in one embodiment, can monitor certain characteristics of the receiver devices of the user and determine when to cause a redirection in communication (or send a redirect request to a contact) in response to the monitored characteristics. These characteristics can include characteristics that stimulate, or trigger, a redirection process, as well as characteristics that direct the handling of a redirected communication when the redirection process has been triggered. In some embodiments, the base station controller receives an indication, or a trigger, from primary device 105 or secondary device 110 that a device switch is desired. The base station controller may then inform participant device 115 that primary device 105 has become unavailable and that the user may be reached via secondary device 110.

In some embodiments, primary device 105 can detect an indication or a device switch stimulus that a device switch may be desired. The characteristics that stimulate the device switch can include user-initiated switch commands received from one or more of the user's devices, a location characteristic of a device (provided via, e.g., a global position system (GPS), wireless triangulation, or cellular trangulation), a timing characteristic (e.g., time of day, day of week, etc.), a power level characteristic (e.g., remaining battery power), a signal level characteristic (e.g., a reception signal strength), and the like. While in this example, the device switch stimulus is detected by primary device 105, the various devices (e.g., device 110) and components in FIG. 1 may also perform the determination as to when a device switch may be desired. For example, a server (not shown) in network 130 may monitor certain characteristics of primary device 105 and determine that a device switch is desired when predetermined criteria are met.

When a device switch stimulus is detected, the secondary device can be determined. In some embodiments, a user may specify the desired secondary device (e.g., by inputting identifying information of the secondary device). In some embodiments, the primary device can detect the devices in the user's vicinity and allow the user to select the desired secondary device from the detected list of devices. Further, in some embodiments, the user may pre-configure a preferred order for a list of devices in the event of a device switch. In some such embodiments, the secondary device may be automatically selected upon identifying that the device is next on the list, available (i.e., powered on and operating), and within a threshold distance of the user.

When the primary device is no longer available, secondary device 110 or a component in network 130 may notify participant device 115 that the primary device is no longer available. In some embodiments, the notification can include identifying information of the secondary device such that participant device 115 can send a communication request to the secondary device using the received information. The notification can also include communication capability information such that the type of communication request sent to the secondary device can be based on the available communication capabilities of the secondary device.

In the example illustrated in FIG. 1, a server (not shown) in network 130 can send the notification to participant device 115 in response to receiving an indication that primary device 105 is no longer available. Upon receiving the notification, participant device 115 may send a communication request to secondary device 110 such that a previous communication between primary device 105 and participant device 115 can be resumed with the secondary device. If primary device 105 and participant device 115 were not in the middle of a communication when primary device 105 becomes unavailable, a component (e.g., a server) in network 130 can send the notification to participant device 115 after a communication request directed to primary device 105 has been received.

II. Flow Overview

Figure 2:
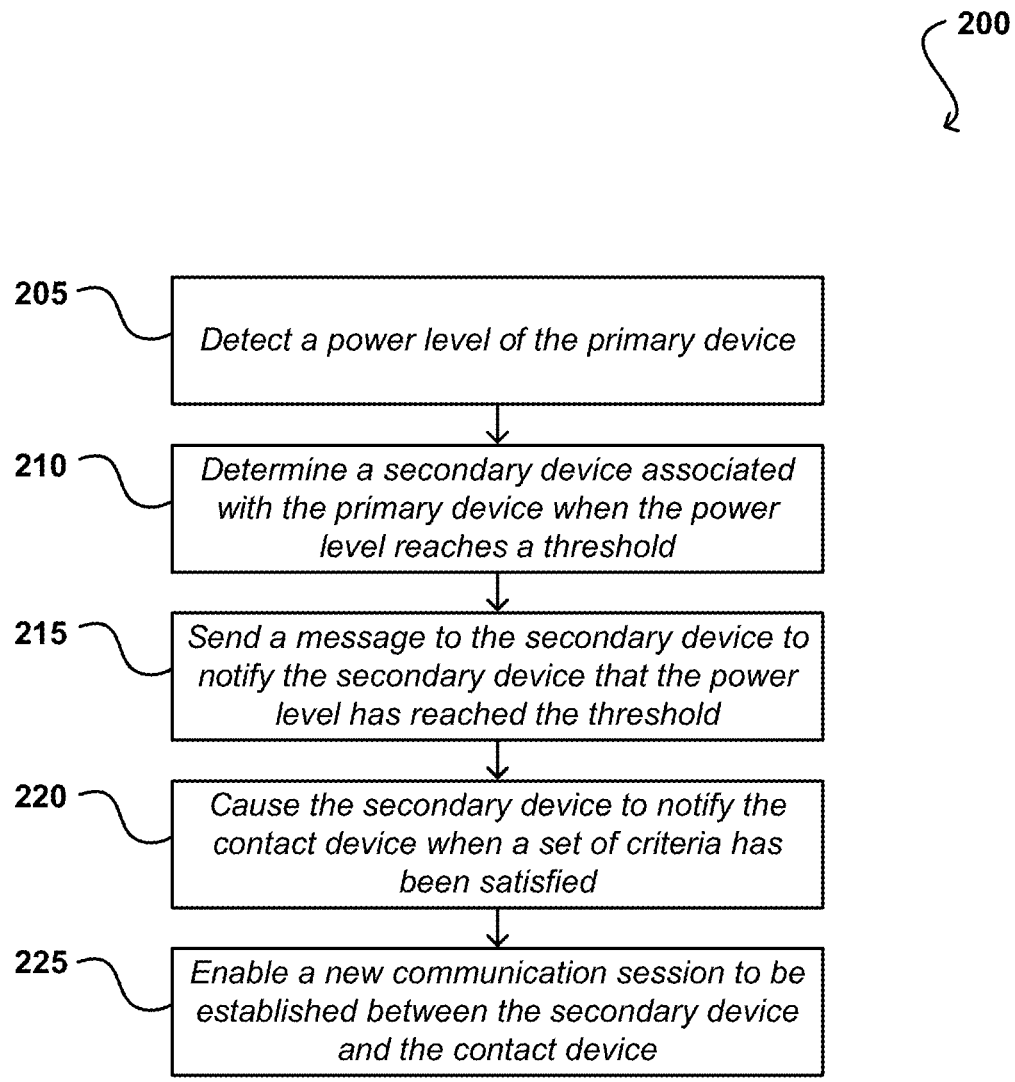
FIG. 2 is a flow chart of illustrative process of some embodiments for re-establishing a communication session with a secondary device of the user when a primary device becomes unavailable according to some embodiments.

As mentioned above, some embodiments enable a user to switch devices to continue a communication when a primary device of the user becomes unavailable. Upon detecting a device switch stimulus, the primary device in some embodiments can automatically cause a secondary device to become its substitute. FIG. 2 is a flow chart of illustrative process 200 of some embodiments for re-establishing a communication session with a secondary device of the user when the primary device becomes unavailable. Process 200 can be performed by a single device (e.g., device 105 in FIG. 1), multiple devices (e.g., devices 105-115 in FIG. 1), a server and a device (e.g., server component in network 130 and one of devices 105-115 in FIG. 1), or any suitable combination of servers and devices. Process 200 can begin at block 205.

As shown at block 205, a power level of the primary device can be detected. In some embodiments, the primary device can determine whether a power-supply unit (e.g., a battery) is in a low-voltage state. Based on the detected battery condition, some embodiments can determine that an indication to switch devices (also referred to as a device switch stimulus) from a primary device of a first participant to a secondary device has been received. In some embodiments, a device switch stimulus such as the power level of the device falling below a certain threshold can be received by the primary device (e.g., device 105 in FIG. 1). Various other device switch stimuli may serve as indications to switch devices, such as a reception signal falling below a threshold value, a manual selection by the user, etc.

At block 210, the secondary device associated with the primary device can be determined. In some embodiments, the primary device can determine the secondary device in response to the detecting that the power level of the primary device has reached a threshold. Some embodiments enable the user to specify a desired secondary device, for example, by allowing the user to input identifying information of the device. In some embodiments, the primary device can perform a search for other devices within the user's vicinity (e.g., within a threshold distance). Upon detecting one or more devices, the primary device can present a list of available devices to the user. The user may select a device from the auto-populated list of available devices.

In some embodiments, the user may preconfigure a preference order for the user's various devices. The preference order can list the user's devices in an order in which the user would prefer the secondary device to be. The device can then identify the secondary device by determining whether the next device in the preference order is within a threshold distance of the user and is available for communication. A number of other factors, such as a battery life and reception of the device, may also be considered, as further described below. If a predetermined set of criteria is met, then the device may be identified as the secondary device. For example, if the device is operable, within five feet of the user, and has the highest order in the list that satisfies these requirements, then the device may be identified as the user's secondary device.

In some embodiments, a suggested secondary device may be determined based on the communication condition of the devices. As described above, a number of factors for each of the devices in the list of available devices may be assessed (e.g., by a server or by the primary device) and taken into consideration when computing a score for each device. For example, the primary device may assess factors including a signal reception, battery life, the distance to the user, etc. and compute a score based on those factors. In some embodiments, the device assigned the highest score from the assessment may be identified as the secondary device. Some embodiments order the devices in an order based on their respective scores. The ordered list may then be presented to the user for the user's selection.

At block 215, a message can be sent to the secondary device to notify the secondary device that the power level of the primary device has reached the threshold. In some embodiments, the message can include a protocol that indicates when the secondary device should inform the contact device to send a communication request to the secondary device. The protocol can indicate that once a set of criteria has been satisfied (e.g., the secondary device ceasing to receive a pinging signal from the primary device), the secondary device can notify the contact device to send a communication request to the secondary device. In some embodiments, the protocol can specify for the secondary device to cause the contact device to send the communication request when the secondary device ceases to receive a pinging signal from the primary device for a threshold period of time.

At block 220, the secondary device can be caused to notify the contact device when a set of criteria has been satisfied. In some embodiments, the protocol specified by the primary device may indicate that the secondary device should notify the contact device when the secondary device no longer receives a pinging (or when the secondary device no longer receives a response in the instance where the secondary device is performing the pinging). As such, the primary device can cause the secondary device to notify the contact device when the criteria specified by the protocol has been satisfied.

In some embodiments, the secondary device (or a server or a basestation controller part of a network such as network 130 in FIG. 1) may send a message to the contact device to inform the contact (e.g., participant 125 in FIG. 1) that the primary device will be unavailable. Identifying information and communication capability information of the secondary device can also be provided to the contact device. In some embodiments, the notification message can be sent to the contact device in response to a determination (e.g., by the secondary device, by the server) that the primary device has become unavailable (e.g., reached another threshold value such as 1% power level).

At block 225, a new communication between the secondary device and the contact device can be established. In some embodiments, upon receiving the notification message, the contact device may be prompted to send a communication request to the secondary device. A communication session between the secondary device and the contact device can be established. In response to receiving a communication request from the contact device, the secondary device can accept the communication request and establish the communication session. In some embodiments, the communication during the transition between the primary device and the secondary device can be seamless, thereby allowing the users to continue their communication virtually without having to pause the conversation, or with minimal interruption.

In some embodiments, the secondary device may substitute the primary device after the primary device becomes unavailable or inoperable for carrying on a communication session (e.g., a power level of the primary device falls below 1%). After the primary device becomes inoperable, any contact device that sends a communication request to the primary device may receive a notification that the primary device is no longer available. Upon receiving the notification, the contact device may be caused to redirect its communication request (i.e., send another communication request) to the secondary device.

Some or all of process 200 (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program to be executed by processing unit(s), such as a browser application. The computer-readable storage medium may be non-transitory.

III. Setup and Performance of a Device Switch Operation

Figure 3:
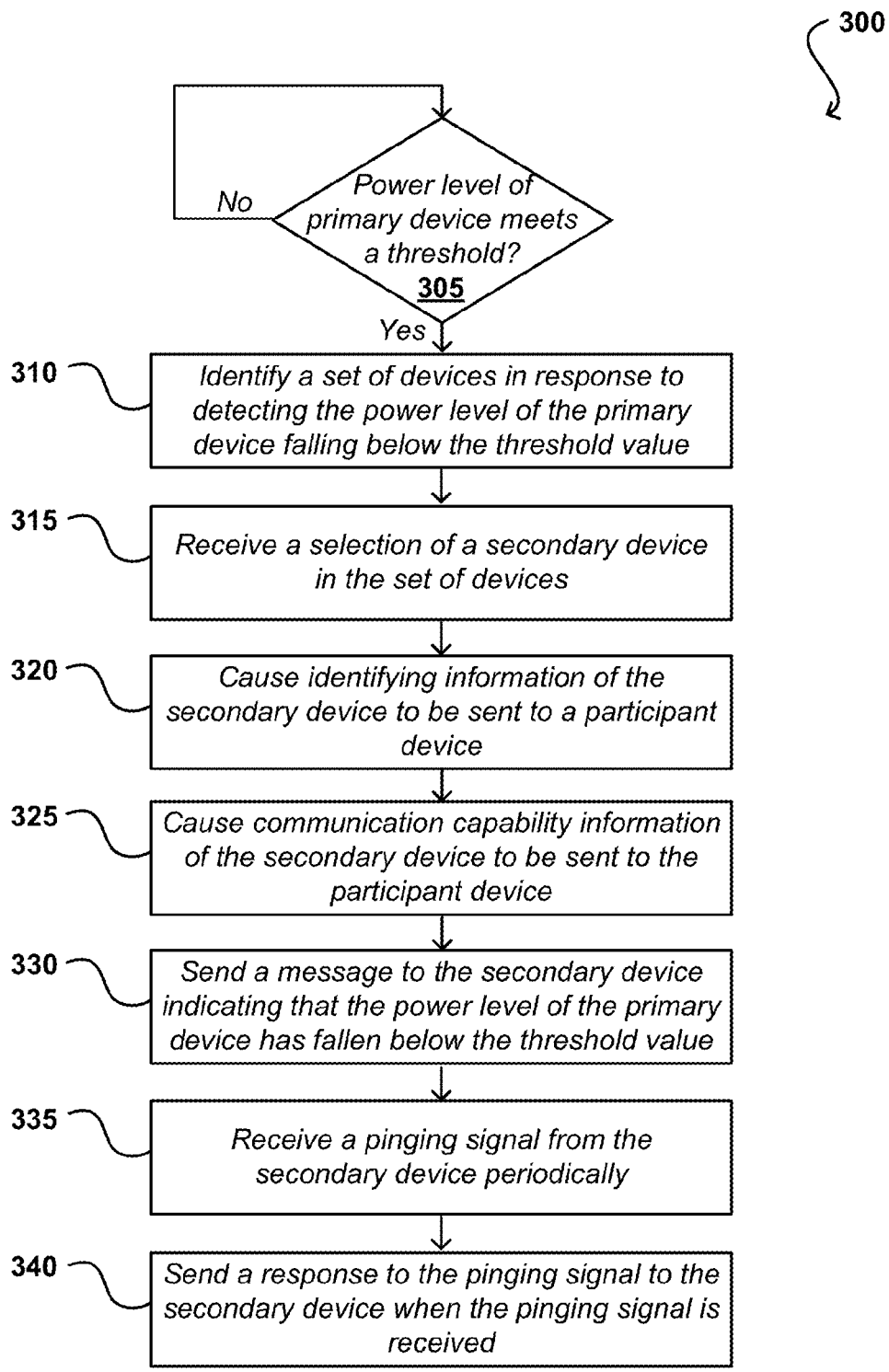
FIG. 3 is a flow chart of illustrative process for causing a participant device to send a communication request to a user's secondary device when the user's primary device is low on battery according to some embodiments.
Figure 4:
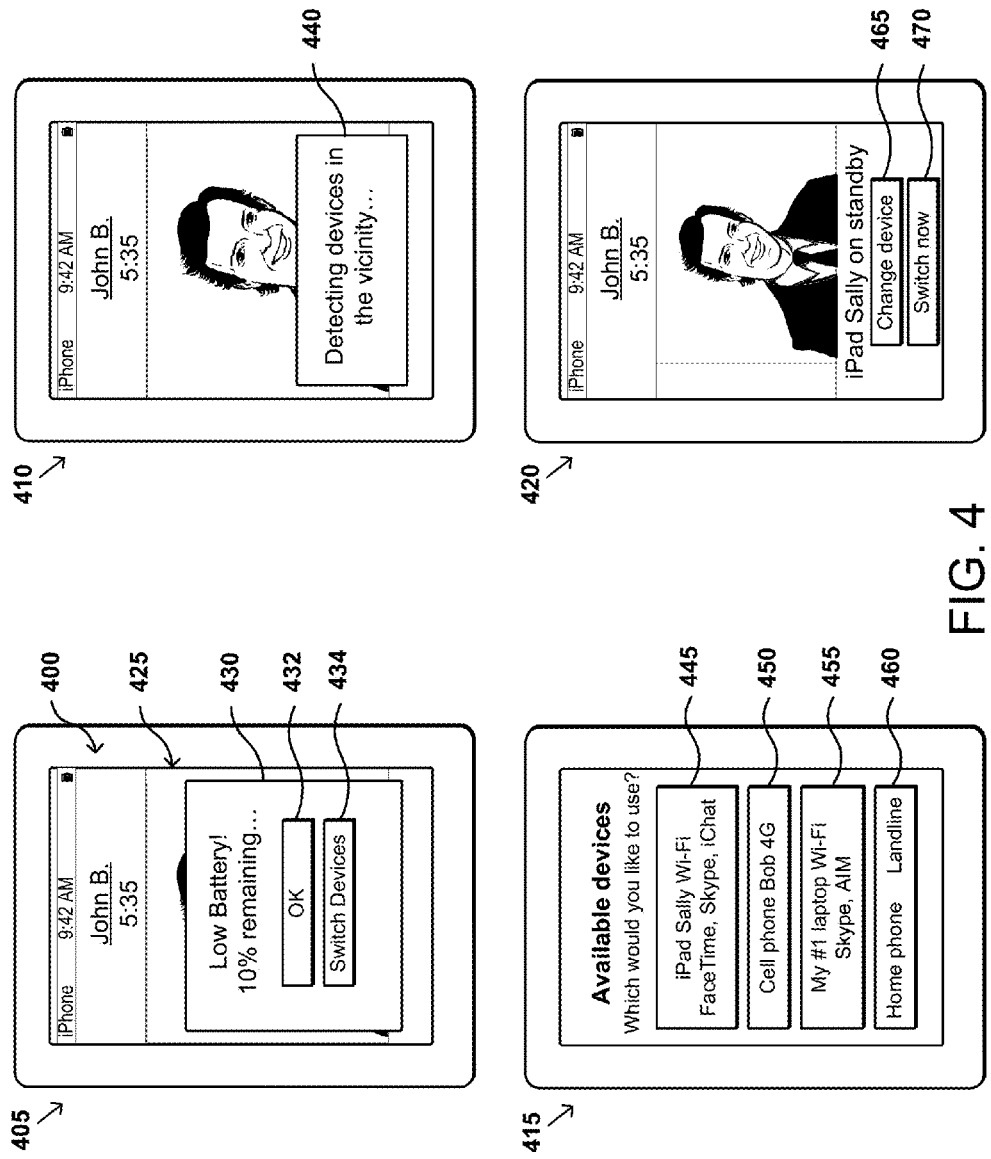
FIG. 4 illustrates an example of a setup sequence through a device switch application of some embodiments.

FIG. 3 is a flow chart of illustrative process 300 for causing a contact device (also referred to as a participant device) to send a communication request to a user's secondary device when the user's primary device is low on battery. Process 300 will be described by reference to FIG. 4, which illustrates an example of a setup sequence through a device switch application of some embodiments. FIG. 4 illustrates four stages 405-420 of GUI 400 for setting up a secondary device transition on a primary device that has received an indication to switch devices (e.g., running low on battery). GUI 400 includes a composite display area 425. Displayed in composite display area 425 includes an image (partially covered) of the person (i.e., John B.) with whom the user of the device is currently in communication. The image can be a static image previously captured and stored on the device.

As shown in FIG. 3, process 300 begins at block 305. At block 305, a determination is made as to whether a power level of a primary device has fallen below a threshold level. In some embodiments, the primary device can determine whether the power level has fallen below a threshold level by detecting a power level of the device and by comparing the power level against a predetermined threshold. The predetermined threshold can be configurable by the user or an administrator in some embodiments. When the primary device detects that the power level has fallen below a threshold level (e.g., 10% battery life, 2-3% battery life), the primary device can inform the user that the battery is running low and provide the option to switch devices. Although the device switch stimulus is a battery level falling below a threshold value in this example, the device switch stimulus may be any of a number of other factors as described.

As shown in the first stage 405 of FIG. 4, a notification 430 (e.g., in a pop-up overlay) is displayed over the image of the participant with whom the user of the device is in communication on GUI 400. Notification 430 can provide a warning that the device may become unavailable due to receiving a device switch stimulus. In this example, the device switch stimulus is the indication that the device is falling below a threshold value of 10%. Notification 430 can include a selectable option 434 for the user to switch devices. As shown in this example, the user may decline to activate the device switch option by simply selecting the option 432 to acknowledge the warning.

Returning to FIG. 3, at block 310, a set of devices in a vicinity of the user can be identified in response to determining that the power level of the primary device has fallen below a threshold level. In some embodiments, the primary device can identify the set of devices by detecting devices within a vicinity or threshold distance of the user (e.g., via Bluetooth®, via global positioning system (GPS), via a LAN). In certain embodiments, the primary device can identify the devices by determining a set of devices associated with the user's profile. For example, the user may have a number of devices (e.g., a laptop, a portable media player, a tablet computing device) registered under the user's account profile for a service such as a cloud computing service.

The second stage 410 of FIG. 4 illustrates an indication overlay 440 that the devices are being detected and identified by the device. The primary device may search for devices in the vicinity of the primary device and identify those that are registered under the same account. The threshold distance from the primary device being searched can be preconfigured by a user or an administrator in some embodiments. The third stage 415 of FIG. 4 illustrates that a number of devices has been detected and presented to the user. In some embodiments, the communication capabilities (e.g., whether a device is Wi-Fi capable, cellular capable, etc.) of each of the identified devices can be determined (e.g., from the user profile) and presented to the user. As shown in third stage 415, a number of devices and their respective communication capabilities are displayed across icons 445-460. Different embodiments may display a different set of information that may be preconfigurable by the user.

Returning to FIG. 3, at block 315, a selection of a device in the identified set of devices can be received. As shown in stage 415 of FIG. 4, the user may select one of the selectable items 445-460 to be the secondary device. While some embodiments present selectable options for the user to select the secondary device in the order the devices were detected or in any order, some embodiments may allow the user to pre-identify a preference order for the secondary device. Upon detecting the availability of a number of devices, the primary device may present those devices in the order specified by the user.

Further, some embodiments may determine communication capabilities of each of the identified devices and present the devices in an order that indicates the devices with the most capabilities or best current status at the top. For example, a number of parameters of the identified devices can be monitored, such as a power level, a reception level, the number of available communication services available, a mobility level (i.e., wireless capability), a size factor, etc. The various parameters of the devices can be determined and then ordered based on their relative communication capabilities. As such, the user may be informed of the devices within the vicinity that might have the best status (e.g., best reception, best battery life) out of the all the currently available devices.

Stage 420 of FIG. 4 illustrates that the secondary device has been selected. As shown in stage 420, the user may change a desired secondary device by selecting selectable icon 465 or request to switch the devices immediately by selecting selectable icon 470. As described, while some embodiments allow the user to select a desired secondary device out of the identified available devices, some embodiments perform the determination automatically without user interaction. In those embodiments, stage 415 may be skipped.

Returning to FIG. 3, at block 320, identifying information of the secondary device can be caused to be sent to the participant device (also referred to as the contact device). In some embodiments, the primary device can send identifying information of the secondary device to the device of the second participant upon identifying the secondary device. The identifying information can include a device identifier, a phone number of the secondary device, an account for an electronic communication service accessible through the secondary device, etc.

At block 325, communication capability information of the secondary device can be caused to be sent to the device of the second participant. In some embodiments, the identifying information and communication capability information can be sent to the participant device by a server or secondary device itself.

At block 330, a message can be sent to the secondary device indicating that the power level of the primary device has fallen below the threshold value. In some embodiments, the primary device can send the message to the secondary device in response to receiving the identification of the secondary device. The message can notify the secondary device that it has been identified to replace the primary device when the primary device becomes unavailable (e.g., when a power level of the primary device reaches another threshold value, when another or different device stimulus is received).

In some embodiments the message can include data for establishing a protocol (also referred to as device switch protocol) between the primary device and the secondary device. The protocol can specify for the secondary device to ping the primary device on a periodic basis. In some embodiments, the frequency for pinging the primary device can be preset by a user or an administrator. The pinging may be performed across any of a number of networks, such as Bluetooth®, Wi-Fi, etc. In some embodiments, the protocol can specify for the secondary device to notify the participant device when a response has not been received beyond a threshold period of time.

At block 335, a pinging signal can be received from the secondary device on a periodic basis. The secondary device can ping the primary device periodically to determine when the primary device becomes unavailable or unreachable (i.e., non-operable, dead). The ping can operate by sending one or more echo request packets (e.g., Internet Control Message Protocol (ICMP) echo request packets) to a target host (e.g., a primary device) and waiting for a response (e.g., an ICMP response). In some embodiments, the secondary device can determine that the primary device has become unavailable when a response from the pinging has not been received beyond a threshold period of time. When the response has not been received beyond a threshold period of time, the secondary device (or a server) can notify the participant device that the primary device is no longer available. In some embodiments, the participant device may then send the secondary device a communication request in response to receiving the notification that the primary device is no longer available. In one embodiment, the participant device may send the secondary device a communication request when further communication requests directed to the primary device has been received.

At block 340, a response to the pinging signal can be sent to the secondary device when the primary device receives the pinging signal. The primary device can continually respond to the pinging from the secondary device (or server) until the primary device is no longer available. As described above, once the primary device is determined to be no longer available, the secondary device (or the server in some embodiments) can notify the participant device and cause the participant device to send the secondary device a communication request in some embodiments.

In some embodiments, the primary device sends a pinging signal to the secondary device (or server) in a periodic manner while the primary device is still available. The pinging signal can be a two way communication where a response by the device being pinged may be prompted in response to receiving the pinging signal. In some embodiments, the primary device pings the secondary device by sending a sample code to the secondary device where a response signal from the secondary device can be received when network connectivity between the primary and secondary devices exists. The secondary device may determine that the primary device has become unavailable or unreachable when the secondary device ceases to receive a signal (e.g., the pinging signal) from the primary device.

In some embodiments, the secondary device determines that the primary device has become unavailable after not receiving the signal beyond a threshold period of time. The threshold period can be preconfigured by a user or a system administrator in some embodiments. In some embodiments, when the secondary device ceases to receive a pinging signal from the primary device, the secondary device (or a server) can send a notification of unavailability of the primary device to the device of the second participant. Upon the second participant's consent, the device of the second participant may then send a communication request to the secondary device and establish a communication session.

While some embodiments allow the user to decide whether a device switch is desired, some embodiments automatically switch the user of a primary device to a secondary device when the primary device receives a device switch stimulus, such as detecting a low power level. In some embodiments, the device can be preconfigured to perform the automatic takeover when the device switch stimulus is received. The primary device may automatically determine a secondary device and enable the device switch without requiring user interaction.

Figure 5:
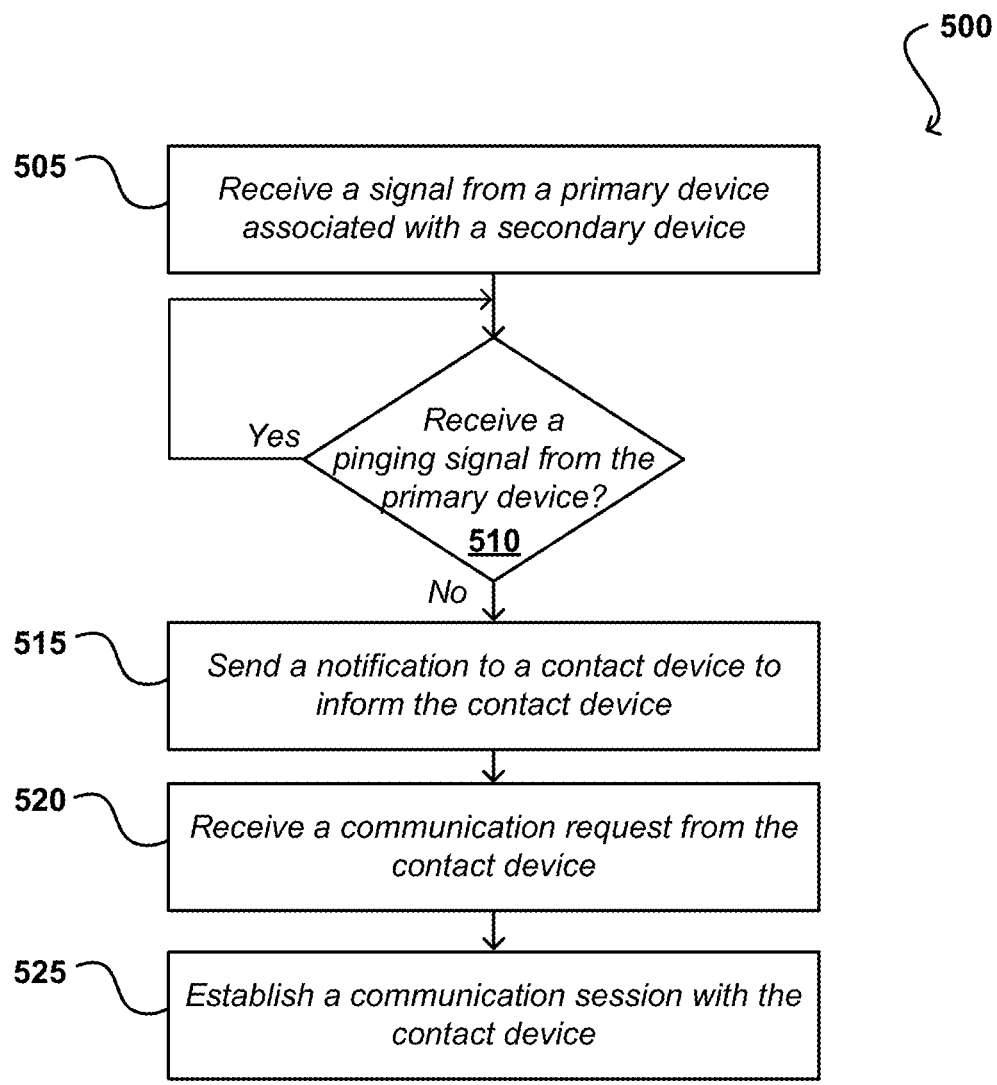
FIG. 5 is a flow chart of illustrative process for notifying the participant device that the primary device has become unavailable according to some embodiments.

As described above, the secondary device can notify a contact device that the primary device has become unavailable and that the user can be reached via the secondary device. FIG. 5 is a flow chart of illustrative process 500 for notifying the contact device that the primary device has become unavailable according to some embodiments. In some embodiments, process 500 can begin at block 505. At block 505, a secondary device associated with a primary device can receive a signal from the primary device. In some embodiments, the secondary device can receive a signal in response to a power level of the primary device reaching a minimum threshold. The signal can indicate that power level of the primary device is low or below a threshold value or percentage. The primary device can be in a communication session with a contact device prior to the secondary device receiving the signal from the primary device. In some embodiments, a previous association may exist between the primary device and the secondary device where, for example, the devices were both registered under a same account or user profile, the devices have a common user, the devices have been associated with each other via a mobile application or web service, or the devices are both accessible by the user.

In some embodiments, the primary device can send the secondary device a signal and/or a message to indicate that the power level of the primary device has reached a minimum threshold. The message can include identification information of the primary device (e.g., a device ID). In some embodiments, the secondary device can use the identification information to ping the primary device periodically and determine whether the primary device is still available (i.e., operating) and responsive. The secondary device in some embodiments can determine that the primary device has reached another minimum threshold (e.g., 0% power level, 0-1% power level) when the secondary device no longer receives a response from the primary device.

In some embodiments, the message can include data for establishing a device switch protocol. In some instances, the device switch protocol may specify for the secondary device to ping the primary device periodically. In the event that the secondary device ceases to receive a response from the primary device beyond a period of time (e.g., 30 second, 1 second), the secondary device may determine that the primary device is no longer available. The device switch protocol may cause the secondary device to send a message to a device of the second participant when the secondary device has determined that the primary device is no longer available.

In some embodiments, the device switch protocol can indicate when the secondary device should notify the contact device that the primary device is no longer available and cause the contact device to send a communication request to the secondary device. For example, the device switch protocol may indicate that the secondary device should notify the contact device when the secondary device ceases to receive a signal (e.g., a ping) from the primary device, e.g., for beyond a threshold period of time.

At block 510, a determination is made as to whether a pinging signal has been received from the primary device. In the instance where the protocol has specified that a notification is sent to the contact device when the secondary device no longer receives a pinging signal, the primary device performs the periodic pinging. As described, in some embodiments, the secondary device pings the primary device. When a response is received within a threshold interval, process 500 returns to block 510. In some embodiments, the threshold interval is determined based on the frequency of the pinging signals and continues to determine whether a pinging signal has been received from the primary device. The threshold interval may be preconfigured by a user or an administrator. If the response has been received within the threshold interval, process 500 returns to block 515 and determines again whether a response has been received within the threshold interval.

At block 515, if the response has not been received within the threshold interval, a message or notification is sent to the contact device. In some embodiments, the message is sent along with information associated with the secondary device. For instance, the message may be sent along with identifying information and communication capability information of the secondary device. In some embodiments, identifying information may include a device identifier, a phone number, a handle, etc. The communication capability information can include electronic communication services available on the secondary device and networking capabilities (e.g., WiFi capable, cellular communication capable).

At block 520, a communication request from the contact device can be received. Based on the protocol, the contact device may send the secondary device a communication request upon receiving an indication that the primary device is low on power or battery. At block 525, a communication session is established with the contact device. In some embodiments, a communication session may be established when the secondary device receives a communication request from the contact device and accepts the request. While it has been described that the contact device may be caused to send a communication request to the secondary device to resume the communication, some embodiments allow the secondary device to send the communication request to the contact device upon determining that the primary device has become unavailable.

In the example described above, the primary device is determined to be unavailable when the secondary device no longer receives a response signal from its regular pinging. In some embodiments, the primary device can be determined to be unavailable differently. In one example, the primary device can ping the secondary device periodically. When the secondary device ceases to receive a pinging signal from the primary device (e.g., for beyond a threshold period of time), the secondary device can determine that the primary device is no longer available. In another example, a network server can periodically ping the primary device and determine that the primary device is no longer available when the network server ceases to receive a response signal for beyond a threshold period of time.

As described above, a system for dynamic device switch may include a server (e.g., a server within network 130 in FIG. 1). In some embodiments, a server (or a basestation controller component) may facilitate communications amongst the devices by causing the device of the second participant to send a communication request to the secondary device when the primary device becomes unavailable. The sever can ping the primary device periodically in response to determining that a device switch stimulus (e.g., the power level hitting a threshold value) from the primary device has been received. When the server has determined that the primary device has become unavailable, the server can send a message to the device of the second participant and cause the device to send the communication request to the secondary device.

Figure 6:
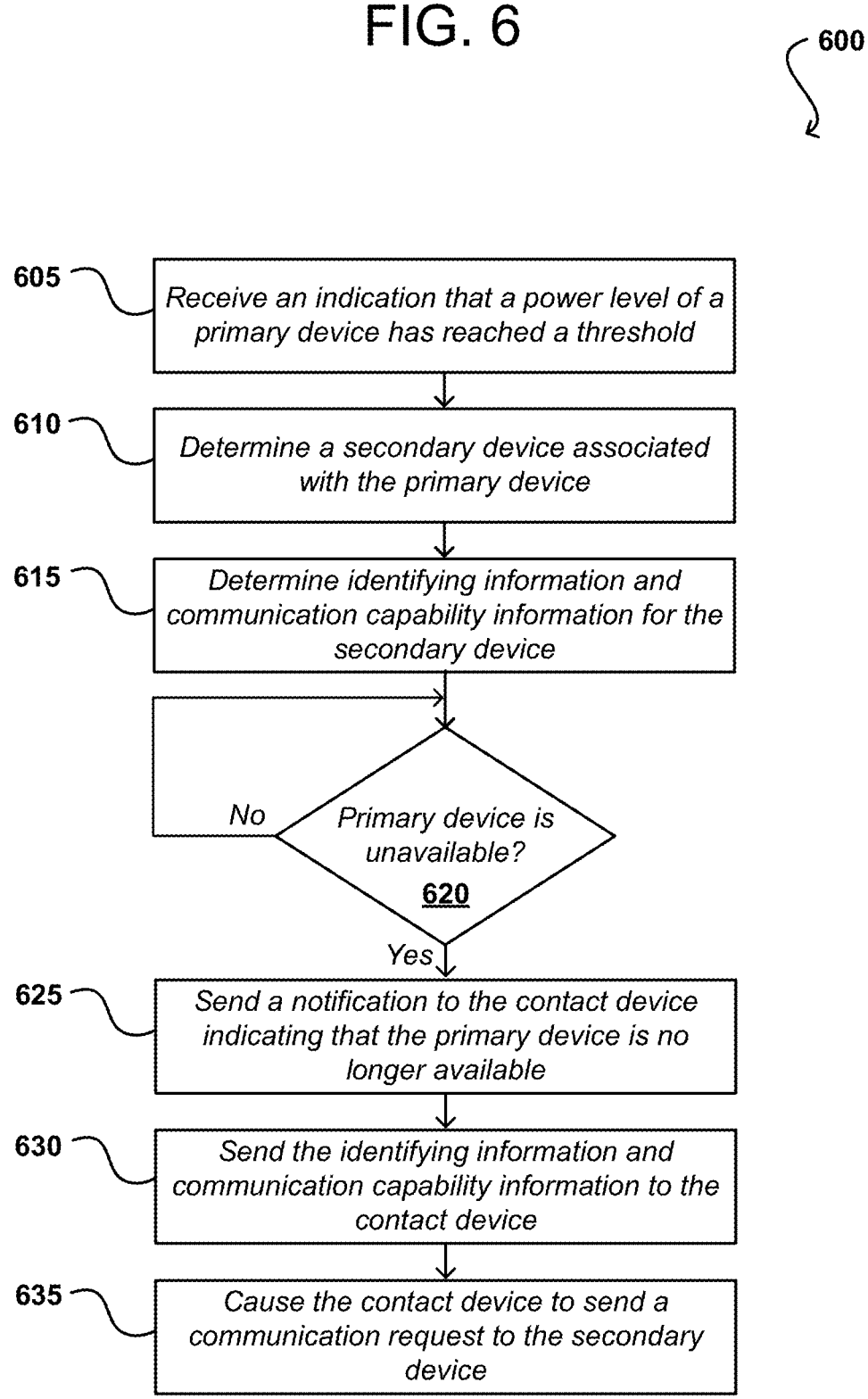
FIG. 6 is a flowchart of illustrative process for facilitating a dynamic device switch in accordance with some embodiments.

FIG. 6 is a flowchart of illustrative process 600 for facilitating a dynamic device switch in accordance with some embodiments. Process 600 can be performed by a single device (e.g., device), multiple devices, a server and a device, or any suitable combination of servers and devices. One of ordinary skill would recognize that process 600 can be performed by one or more servers or basestation controllers that are part of one or more electronic communication services.

Electronic communication service refers to any service capable of facilitating communication between two or more users who have accounts on that service (e.g., by providing a communication platform via an application such as a VoIP application). An electronic communication service can provide communication over various channels, including cellular network, instant messaging (IM), Voice over Internet Protocol (VoIP), etc. Examples of different electronic communication services can include AIM®, iChat®, Skype®, Viber®, etc. A number of electronic communication services can provide real time communication between registered users. The types of communication between the users can include audio, video, image, and text communications.

Process 600 can begin at block 605. At block 605, an indication that a primary device of a first participant is low on battery can be received. As described, the primary device of the first participant can detect that the power level is below a threshold value. In response to detecting the power level falling below a threshold, the primary device can notify the server that the power level of the primary device has fallen below the threshold.

In some embodiments, the server may detect that the power level of the primary device has fallen below the threshold by monitoring a status of the primary device. Although in this example, the device switch stimulus is a power level of a device falling below a threshold, the device switch stimulus can be a number of other pre-specified conditions. For example, the device switch stimulus may be a signal reception level of the device falling below a threshold or a manual switch command from a user.

At block 610, a server or a primary device in some embodiments can determine a secondary device associated with the primary device. As described, a number of devices within a vicinity of the primary device can be identified. Some embodiments can detect a number of devices within a threshold distance of the primary device, e.g., via GSM localization, GPS data, or other location determination methods). After identifying the list of devices, the server can present the list of devices to the user for the user to select the desired secondary device. As described above, the list of devices may be identified by the primary device in some embodiments by detecting devices within an area (e.g., via Bluetooth®, via the WiFi network).

In some embodiments, the secondary device can be determined from the list of devices. In some embodiments, a server can identify the secondary device from the list of devices by identifying a preference order previously specified by the user (e.g., in a user profile for an account, in a preference setting). The server in some embodiments may identify the secondary device by monitoring communication parameters of each device in the list of devices and determining the device with the best communication conditions (e.g., a battery life of over 50%, a signal reception of at least a minimum value—such as three bars, a number of communication applications available, network accessibility, etc.).

At block 615, identifying information and communication capability information for the secondary device can be determined. In some embodiments, a server can obtain information associated with the devices, such as a number to contact the device, a handle for an electronic communication service accessible via the secondary device, internet connectivity, and network functionalities of each device (e.g., whether a device is cellular capable or Internet capable, etc.). The information associated with the devices can be obtained from a profile associated with a user of the primary device or from electronic communication services.

At block 620, a determination is made as to whether the primary device is unavailable. In some embodiments, a server may ping the primary device periodically to determine whether the primary device is still operable. The server can determine that the primary device is still operable as it receives a response signal from pinging the primary device. When the server ceases to receive a response from a ping, the server may determine that the primary device is unavailable. In some embodiments, the server may determine that the primary device is unavailable after the server fails to receive a response signal after a threshold period of time (e.g., 5 seconds).

In some embodiments, the server may determine that the primary device is unavailable upon receiving an indication from the secondary device. After the secondary device has been identified, the secondary device (instead of the server) can ping the primary device periodically until the secondary device fails to receive a response beyond a threshold period of time. The secondary device may then inform the server that the primary device has become unavailable.

If the primary device is not determined to be unavailable, process 600 returns to block 620 and continually determines whether the primary device has become unavailable. If the primary device is determined to be unavailable, at block 625, the participant device is notified that the primary device is no longer available. In some embodiments, a server can send a message to the contact device when the primary device is determined to be unavailable. The server may trigger the contact device to send a communication request to the secondary device in some embodiments, as described below. Some embodiments further enable future communication requests to be redirected to the secondary device. Upon receiving a communication request intended for the user's electronic device, the base station controller in some embodiments may inform the caller to send the communication request to the secondary device of the user instead.

At block 630, identifying information and communication capability information of the secondary device can be sent to the participant device. The server can send identifying information (e.g., a device ID) and communication capability information (e.g., capable of transmitting and receiving through the cellular network) to the participant device in response to determining that the primary device has become unavailable.

At block 635, the server can cause the contact device to send the communication request to the secondary device. A communication session between the secondary device and the device of the second participant can be established. When the secondary device or server notifies the participant device that the primary device has become unavailable, the participant device can be prompted to send a communication request to the secondary device. The communication session can be established when the secondary device accepts the request.

Figure 7:
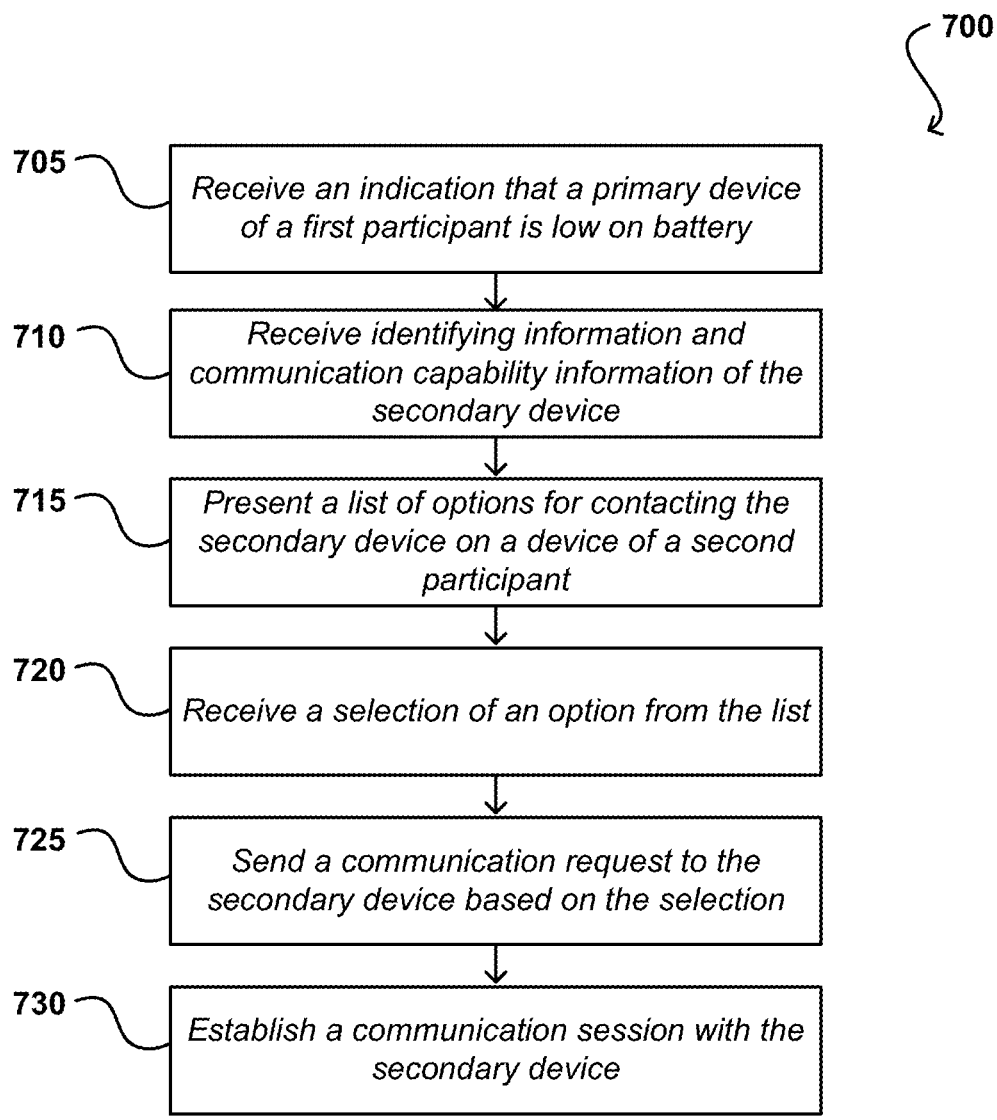
FIG. 7 is a flow chart of illustrative process for establishing a communication with a secondary device to continue a communication according to some embodiments.

As described, some embodiments enable the second participant to select the method to contact the secondary device of the first participant. FIG. 7 is a flow chart of illustrative process 700 for establishing a communication with a secondary device to continue a communication according to some embodiments. Process 700 can be performed by a single device (e.g., device 115 in FIG. 1), multiple devices, a server and a device, or any suitable combination of servers and devices. Process 700 can begin at block 705.

At block 705, an indication that a primary device of a first participant is low on battery is received. In some embodiments, a device of the second participant (also referred to as a participant device) receives a signal from either a server or the secondary device informing the participant device that the primary device is no longer available.

At block 710, identifying information and communication capability information of a secondary device can be received. As described above, a secondary device can be selected by a user of the primary device or identified by the primary device or server in some embodiments. Upon identifying a secondary device for the device switch, information that identifies the secondary device and/or data that indicates the communication capability (e.g., Wi-Fi enabled, cellular capable) of the secondary device can be provided to the participant device. As such, the participant device can present the available methods for communicating with the secondary device to a user of the participant device. The user in some embodiments may select the preferred communication method. In one example, the user may prefer to communication using the cellular network if the secondary device also has such capability. In another example, the user may prefer to communicate using Wi-Fi and therefore select an electronic communication service (e.g., FaceTime®) that uses the Internet network to communicate with the participant device.

At block 715, the participant device can present a list of options in which the participant device can contact the secondary device. The list of options may be determined using the communication capability information of the secondary device. For example, the secondary device may be able to communicate via a cellular network and may be Wi-Fi enabled for communicating via a communication services accessible through the Internet.

At block 720, a selection of an option from the list is received. The participant user may select the desired method in contacting the secondary device.

At block 725, a communication request can be sent to the secondary device based on the selection. In some embodiments, the participant device can send a communication request to the secondary device to establish a communication session with the secondary device. In the event that the participant user selects to contact the participant device via the cellular network, the participant device can send a communication request to a basestation controller. The basestation controller may notify the participant device that the primary device is no longer available and that the participant device can contact the user of the primary device at the secondary device. In the event that the participant user selects a communication service accessible via the Internet, the participant device can send a communication request to a server that is part of the communication service. The server may then cause the participant device t send a communication request to the primary device. At block 730, a communication session may be established with the secondary device when the secondary device accepts the request for communication.

IV. Computer System

Many of the above-described features and applications can be implemented as software processes that are specified as a set of program instructions encoded on a computer readable storage medium. When these program instructions are executed by one or more processing units, the program instructions cause the processing unit(s) to perform the actions indicated in the instructions. Examples of computer readable storage media include CD-ROMs, flash drives, RAM chips, hard drives, EPROMs, etc. The computer readable storage media does not include carrier waves and electronic signals passing wirelessly or over wired connections. "Software" refers generally to sequences of instructions that, when executed by processing unit(s) cause one or more computer systems to perform various operations, thus defining one or more specific machine implementations that execute and perform the operations of the software programs.

Figure 8:
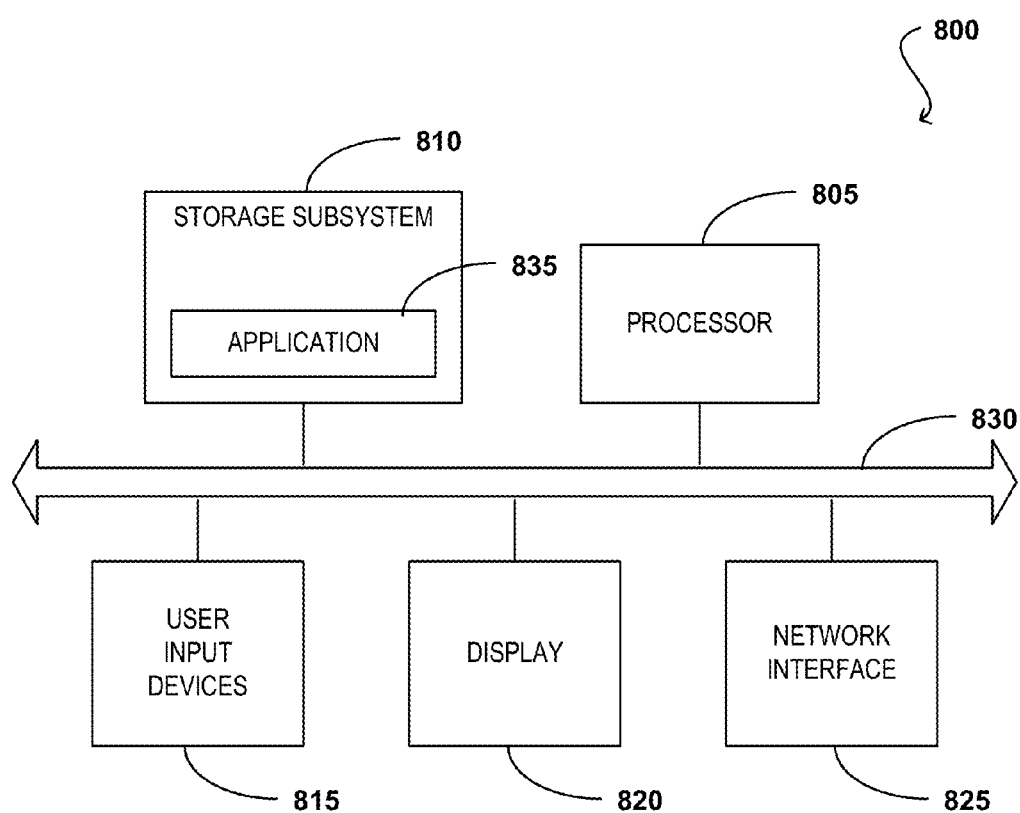
FIG. 8 illustrates a computer system according to some embodiments of the present invention.

FIG. 8 illustrates a computer system 800 according to an embodiment of the present invention. Device switch system 100 in FIG. 1 includes several electronic devices (e.g., electronic devices 105-115 in FIG. 1) that can be implemented within a computer system such as computer system 800 shown here. Computer system 800 can be implemented as any of various computing devices, including, e.g., a desktop or laptop computer, tablet computer, smart phone, personal data assistant (PDA), or any other type of computing device, not limited to any particular form factor. Computer system 800 can include processing unit(s) 805, storage subsystem 810, input devices 815, display 820, network interface 825, and bus 830.

Processing unit(s) 805 can include a single processor, which can have one or more cores, or multiple processors. In some embodiments, processing unit(s) 805 can include a general-purpose primary processor as well as one or more special-purpose co-processors such as graphics processors, digital signal processors, or the like. In some embodiments, some or all processing units 805 can be implemented using customized circuits, such as application specific integrated circuits (ASICs) or field programmable gate arrays (FPGAs). In some embodiments, such integrated circuits execute instructions that are stored on the circuit itself. In other embodiments, processing unit(s) 805 can execute instructions stored in storage subsystem 810.

Storage subsystem 810 can include various memory units such as a system memory, a read-only memory (ROM), and a permanent storage device. The ROM can store static data and instructions that are needed by processing unit(s) 805 and other modules of electronic device 800. The permanent storage device can be a read-and-write memory device. This permanent storage device can be a non-volatile memory unit that stores instructions and data even when computer system 800 is powered down. Some embodiments of the invention can use a mass-storage device (such as a magnetic or optical disk or flash memory) as a permanent storage device. Other embodiments can use a removable storage device (e.g., a floppy disk, a flash drive) as a permanent storage device. The system memory can be a read-and-write memory device or a volatile read-and-write memory, such as dynamic random access memory. The system memory can store some or all of the instructions and data that the processor needs at runtime.

Storage subsystem 810 can include any combination of computer readable storage media including semiconductor memory chips of various types (DRAM, SRAM, SDRAM, flash memory, programmable read-only memory) and so on. Magnetic and/or optical disks can also be used. In some embodiments, storage subsystem 810 can include removable storage media that can be readable and/or writeable; examples of such media include compact disc (CD), read-only digital versatile disc (e.g., DVD-ROM, dual-layer DVD-ROM), read-only and recordable Blue-Ray® disks, ultra density optical disks, flash memory cards (e.g., SD cards, mini-SD cards, micro-SD cards, etc.), magnetic "floppy" disks, and so on. The computer readable storage media do not include carrier waves and transitory electronic signals passing wirelessly or over wired connections.

In some embodiments, storage subsystem 810 can store one or more software programs to be executed by processing unit(s) 805, such as a device switch application 835. As mentioned, "software" can refer to sequences of instructions that, when executed by processing unit(s) 805 cause computer system 800 to perform various operations, thus defining one or more specific machine implementations that execute and perform the operations of the software programs. The instructions can be stored as firmware residing in read-only memory and/or applications stored in magnetic storage that can be read into memory for processing by a processor. Software can be implemented as a single program or a collection of separate programs or program modules that interact as desired. Programs and/or data can be stored in non-volatile storage and copied in whole or in part to volatile working memory during program execution. From storage subsystem 810, processing unit(s) 805 can retrieve program instructions to execute and data to process in order to execute various operations described herein.

A user interface can be provided by one or more user input devices 815, display device 820, and/or and one or more other user output devices (not shown). Input devices 815 can include any device via which a user can provide signals to computing system 800; computing system 800 can interpret the signals as indicative of particular user requests or information. In various embodiments, input devices 815 can include any or all of a keyboard touch pad, touch screen, mouse or other pointing device, scroll wheel, click wheel, dial, button, switch, keypad, microphone, and so on.

Display 820 can display images generated by electronic device 800 and can include various image generation technologies, e.g., a cathode ray tube (CRT), liquid crystal display (LCD), light-emitting diode (LED) including organic light-emitting diodes (OLED), projection system, or the like, together with supporting electronics (e.g., digital-to-analog or analog-to-digital converters, signal processors, or the like). Some embodiments can include a device such as a touchscreen that function as both input and output device. In some embodiments, other user output devices can be provided in addition to or instead of display 820. Examples include indicator lights, speakers, tactile "display" devices, printers, and so on.

In some embodiments, display 820 can provide a graphical user interface, in which visible image elements in certain areas of display 820 are defined as active elements or control elements that the user selects using user input devices 815. For example, the user can manipulate a user input device to position an on-screen cursor or pointer over the control element, then click a button to indicate the selection. Alternatively, the user can touch the control element (e.g., with a finger or stylus) on a touchscreen device. In some embodiments, the user can speak one or more words associated with the control element (the word can be, e.g., a label on the element or a function associated with the element). In some embodiments, user gestures on a touch-sensitive device can be recognized and interpreted as input commands; these gestures can be but need not be associated with any particular array in display 825. Other user interfaces can also be implemented.

Network interface 825 can provide voice and/or data communication capability for electronic device 800. In some embodiments, network interface 825 can include radio frequency (RF) transceiver components for accessing wireless voice and/or data networks (e.g., using cellular telephone technology, advanced data network technology such as 3G, 4G or EDGE, WiFi (IEEE 802.11 family standards, or other mobile communication technologies, or any combination thereof), GPS receiver components, and/or other components. In some embodiments, network interface 825 can provide wired network connectivity (e.g., Ethernet) in addition to or instead of a wireless interface. Network interface 825 can be implemented using a combination of hardware (e.g., antennas, modulators/demodulators, encoders/decoders, and other analog and/or digital signal processing circuits) and software components.

Bus 830 can include various system, peripheral, and chipset buses that communicatively connect the numerous internal devices of electronic device 800. For example, bus 830 can communicatively couple processing unit(s) 805 with storage subsystem 810. Bus 830 also connects to input devices 815 and display 820. Bus 830 also couples electronic device 800 to a network through network interface 825. In this manner, electronic device 800 can be a part of a network of multiple computer systems (e.g., a local area network (LAN), a wide area network (WAN), an Intranet, or a network of networks, such as the Internet. Any or all components of electronic device 800 can be used in conjunction with the invention.

Some embodiments include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter.

Through suitable programming, processing unit(s) 805 can provide various functionality for electronic device 800. For example, processing unit(s) 805 can execute device switch application 835. Device switch application 835 can provide various functionality such as the ability to determine a secondary device to substitute a primary device and cause a participant device to call the secondary device, and so on. In some embodiments, device switch application 835 can provide an automatic taker where the user does not specify the secondary device before the primary device determines the secondary device. The secondary device can substitute the primary device and receive communication requests from the participant device.

It will be appreciated that computer system 800 is illustrative and that variations and modifications are possible. Computer system 800 can have other capabilities not specifically described here (e.g., global positioning system (GPS), power management, one or more cameras, various connection ports for connecting external devices or accessories, etc.). Further, while computer system 800 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

What is claimed is:

1. A method comprising:
    detecting, by a primary device, a power level of the primary device, the primary device being in communication with a contact device;
    determining, by the primary device, a secondary device associated with the primary device;
    sending, by the primary device, a message to the secondary device, the message indicating for the secondary device to continue communication with the contact device when the power level of the primary device reaches a predetermined threshold; and
    enabling, by the primary device, the secondary device to continue communication with the contact device when the power level of the primary device has reached the predetermined threshold.

2. The method of claim 1 further comprising:
    sending a notification to the secondary device, the notification including identifying information associated with the contact device; and
    periodically pinging the secondary device, wherein the power level of the primary device has reached the predetermined threshold when the secondary device ceases to receive the pinging from the primary device beyond a threshold period of time, and wherein a new communication session is established based on the identifying information associated with both the contact device.

3. The method of claim 1 further comprising:
    sending a message to a continuity server, the message specifying for the continuity server to ping the primary device on a periodic basis and notify the contact device when a response has not been received beyond a threshold period of time.

4. The method of claim 1 further comprising:
    sending a message to the contact device, the message including identifying information of the secondary device, wherein enabling the secondary device to continue communication with the contact device includes causing a new communication session to be established between the secondary device and the contact device when a set of criteria has been satisfied.

5. The method of claim 1 wherein enabling the secondary device to continue communication with the contact device includes ceasing to send a pinging signal to the secondary device and thereby causing the secondary device to send a communication request to the contact device to establish the communication between the secondary device and the contact device.

6. The method of claim 1 wherein determining the secondary device includes:
    determining one or more devices associated with a user of the primary device;
    presenting a set of options representing the one or more devices; and
    receiving a selection of one of the set of options, wherein the one of the set of options represents the secondary device.

7. The method of claim 1 wherein determining the secondary device includes:
    determining a set of electronic devices associated with a user of the primary device by accessing profile information associated with the user of the primary device; and
    identifying a subset of the electronic devices in the set of electronic devices that is within a threshold distance of the primary device, wherein the subset of the electronic devices includes the secondary device.

8. The method of claim 1 wherein sending the message to the secondary device thereby enables the secondary device to continue communication with the contact device when the power level of the primary device has been detected to reach the predetermined threshold.

9. The method of claim 1 further comprising:
    identifying one or more devices; and
    determining communication parameters of each of the one or more devices, wherein the secondary device is determined based on the communication parameters of the devices.

10. A system comprising:
    one or more processors;
    memory coupled to the one or more processors, wherein the memory is encoded with a set of instructions configured to:
        detect a power level of a primary device, the primary device being in communication with a contact device;
        determine a secondary device associated with the primary device;
        send a message to the secondary device, the message indicating for the secondary device to continue communication with the contact device when the power level of the primary device reaches a predetermined threshold; and
        enable the secondary device to continue communication with the contact device when the power level of the primary device has reached the predetermined threshold.

11. The system of claim 10 wherein the set of instructions are further configured to:
    send a notification to the secondary device, the notification including identifying information associated with the contact device; and
    periodically ping the secondary device, wherein the power level of the primary device has reached the predetermined threshold when the secondary device ceases to receive the pinging from the primary device beyond a threshold period of time, and wherein a new communication session is established based on the identifying information associated with both the contact device.

12. The system of claim 10 wherein the set of instructions are further configured to:
    send a message to a continuity server, the message specifying for the continuity server to ping the primary device on a periodic basis and notify the contact device when a response has not been received beyond a threshold period of time.

13. The system of claim 10 wherein the set of instructions are further configured to:

send a message to the contact device, the message including identifying information of the secondary device, wherein enabling the secondary device to continue communication with the contact device includes causing a new communication session to be established between the secondary device and the contact device when a set of criteria has been satisfied.

14. The system of claim 10 wherein enabling the secondary device to continue communication with the contact device includes ceasing to send a pinging signal to the secondary device and thereby causing the secondary device to send a communication request to the contact device to establish the communication between the secondary device and the contact device.

15. The system of claim 10 wherein determining the secondary device includes:
   determining one or more devices associated with a user of the primary device;
   presenting a set of options representing the one or more devices; and
   receiving a selection of one of the set of options, wherein the one of the set of options represents the secondary device.

16. The system of claim 10 wherein determining the secondary device includes:
   determining a set of electronic devices associated with a user of the primary device by accessing profile information associated with the user of the primary device; and
   identifying a subset of the electronic devices in the set of electronic devices that is within a threshold distance of the primary device, wherein the subset of the electronic devices includes the secondary device.

17. The system of claim 10 wherein sending the message to the secondary device thereby enables the secondary device to continue communication with the contact device when the power level of the primary device has been detected to reach the predetermined threshold.

18. The system of claim 10 wherein the set of instructions are further configured to:
   identify one or more devices; and
   determine communication parameters of each of the one or more devices, wherein the secondary device is determined based on the communication parameters of the devices.

19. The system of claim 10 wherein the set of instructions are further configured to:
   send another message to the secondary device, the other message specifying for the secondary device to ping the primary device on a periodic basis and notify the contact device when a response has not been received beyond a threshold period of time.

20. One or more non-transitory computer-readable medium comprising computer-executable instructions that, when executed by one or more computer systems, configured the one or more computer systems to perform operations comprising:
   detecting a power level of a primary device, the primary device being in communication with a contact device;
   determining a secondary device associated with the primary device;
   sending a message to the secondary device, the message indicating for the secondary device to continue communication with the contact device when the power level of the primary device reaches a predetermined threshold; and
   enabling the secondary device to continue communication with the contact device when the power level of the primary device has reached the predetermined threshold.

\* \* \* \* \*